Sept. 28, 1965    H. J. SKIDMORE    3,208,494
PREVAILING TORQUE LOCK NUT
Filed Sept. 9, 1963

INVENTOR.
HAROLD J. SKIDMORE
BY
ATTORNEY

3,208,494
PREVAILING TORQUE LOCK NUT
Harold J. Skidmore, Southfield, Mich., assignor to Screw and Bolt Corporation of America, Pittsburgh, Pa., a corporation of Pennsylvania
Filed Sept. 9, 1963, Ser. No. 307,603
4 Claims. (Cl. 151—21)

This application is a continuation-in-part of my co-pending application Serial No. 87,294 filed February 6, 1961, now abandoned.

This invention pertains to lock nuts and more particularly to lock nuts having a crown on one end which is deformed radially and axially to provide a prevailing torque lock nut.

The lock nut of this invention comprises a nut body of any usual exterior shape, i.e. hexagonal, square, round, slotted, ribbed, etc., having a threaded bore extending longitudinally from one end of the body to the other, and a crown extension on one end of the nut body tapering from the corners of the outer wall(s) of the nut body toward the threaded bore. The crown of the lock nuts of this invention is tapered from about 45° to about 20° to the vertical, the crown surface extending from or closely adjacent the threaded bore downwardly to the corners of the side wall(s) of the nut body.

The crown extension is provided with spaced indentations extending from the top edge of the crown downwardly to the lower edge thereof, i.e. at or closely adjacent the side wall(s) of the nut body. The indentations extend from or closely adjacent the top edge of the crown downwardly to the lower edge of the crown at or closely adjacent the side wall(s) of the nut body. It has been found in the development of the lock nut of this invention that greater resilience is obtained in these prevailing torque lock nuts by placing the indentations at the corners of the lock nut, i.e. where side walls meet. In a hex nut, i.e. a six-sided nut, the indentations, which should preferably be spaced at equal distances from each other, comprise three indentations arranged at alternate corners of the nut body. It was found that having the indentations at the midpoint of the side walls provided less torque or thread locking action than when the indentations were placed at the corners of the nut body.

A principal and significant discovery was made when it was found that a lock nut made with a crown extension running directly to the side walls, instead of to and undercut at the nut body resulting in a crown whose base diameter is substantially less than the diametrical distance between opposite corners of the nut body, such as the lock nuts of the instant invention embody, provided substantially greater locking torque or thread locking action, avoided crowns which occasionally cracked during manufacture by cold-heading—due to a substantially reduced cross-sectional area, could be made by the cold-heading process more satisfactorily because the metal of the nut body flowed more smoothly and evenly between the dies, and resulted in a better lock nut at lower cost.

In every instance where comparable crown lock nuts were produced and tested, the crown lock nut of the instant invention provided more locking troque and consistently more uniform locking torque, a minimum of cracking in the crowns, and a generally more satisfactory lock nut, as compared to a similar lock nut having an undercut or indented crown. Two crown tapers have been tested and found very satisfactory—a 45° taper and a 37½° taper to the vertical. In each instance, the lock nuts embodied indentations on the crown arranged at alternate corners of a hex nut.

It is therefore an object of the invention to provide a lock nut of the prevailing torque type with a crown extension on one end thereof, in which the crown tapers downwardly from the end of the nut to the outer corners of the nut body. Another object of the invention is the provision of indentations in the crown which are formed therein by radial and slight axial impaction to displace thread portions adjacent and in the path of the indented portions of the crown forwardly of the indentations. Still another object is to provide a crown extension whose surface is tapered at an angle of from about 45° to about 20° to the vertical, or from about 90° to about 40° included angle, the crown surface extending from one end of the nut at or adjacent the threaded bore to the outer corners or edge of the nut body. Another object is the provision of lock nuts embodying the above characteristics and features which further have considerable resiliency in their crown extensions resulting in superior and excellent locking torque values in thread locking action. Yet a further object of the invention is to provide a lock nut having a crown extension which can be cold-headed, the configuration of the crown being such that the metal flows more smoothly and evenly with minimum strain and stress, resulting in relatively and minimum crack-free crown extensions. Still another object is to provide lock nuts having the above advantageous characteristics at relatively low cost.

These and additional objects and structural features of the invention will become more apparent from the description given below in which terms employed are terms of description and not of limitation.

Reference is here made to the drawing annexed hereto and forming an integral part of this specification, and in which.

Figure 1:
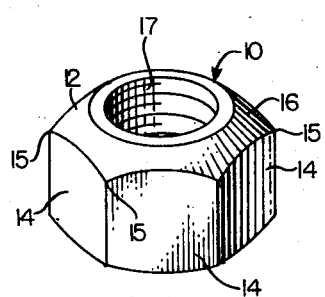
FIGS. 1 and 1a are perspective views of similar lock nuts embodying tapered crown extensions according to the inventive concept here disclosed, the difference being in the angle at which the crown surface is disposed. The crown surface angle represented in FIG. 1 is a 45° angle to the vertical, that in FIG. 1a is a 20° angle to the vertical.
Figure 1A:
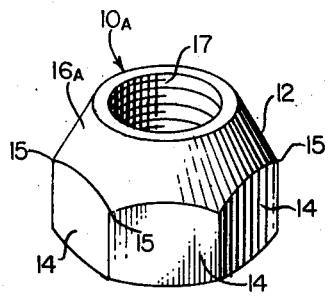

As shown in the several views of the drawing, the crown nut 10 or 10a comprises a nut body 12, side walls 14 meeting at corners 15, a crown extension 16 or 16a, a threaded bore 17 and thread portions 18 deformed radially inwardly and slightly axially adjacent and in the path of the impaction, the thread portions 20 intermediate the deformed thread areas 18 being left relatively undistorted. The lock nut 10 is provided with indentations 24 in the crown extension.

Nuts of the type here described are generally produced either by the machine method or the cold-heading process. Soft or low-carbon steel nuts, of 1110 grade, are preferably made by cold-heading a segment cut from a bar of steel. High carbon steel nuts, such as 1038 grade steel, are usually produced by machining on screw machines, because the steel is too hard to flow smoothly and uniformly in cold heading without cracking. The cold-heading process is much cheaper than the machine method. Round bar stock of mill quality is used in cold heading, whereas the more expensive hexagon stock is required for the machine process.

Crown nuts have been known and in use for some time. These nuts have crown extensions that start at the nut body from an indented or undercut surface tapering upwardly to or closely adjacent the threaded bore. The lock nut of the instant invention embodies a principal and further advantage over the undercut crown nut, namely improved resiliency with more uniform locking torque values. The possibility of cracking the undercut crown during cold-heading is also avoided by the lock nut of the instant invention, in that the crown 10 or 10a extends to the corners 15 of the side walls 14, providing a heavier section of metal at the crown. The metal in this section flows more smoothly and uniformly under cold-heading dies; there are no sharp corners or breaks in continuity as in the indented crown, and the result is a crack-free nut body and crown. When the crown indentations 24 are impacted radially inwardly and slightly axially the distorted thread portions 18 effect a more uniform locking torque upon studs, with a minimum of galling or stud thread destruction, and a greater resiliency results from the heavier sectioned crown 16 or 16a. The significance of resiliency in a prevailing torque lock nut of the type here disclosed resides in the maintenance of comparatively high uniform locking torque values after repeated rethreadings of the nut on a stud, and with no, or no appreciable, stud thread galling or destruction.

In the crown lock nut of this invention, the advantages over indented crown nuts reside in greater resiliency in the crown portion of the nut, higher and more consistent locking torque values, ease in cold-heading, uniformity of production, minimum failures due to cracked crowns, and greater economy and efficiency in production and in improved quality. These unexpected and unobvious results come from the crown configuration disclosed herein, and in which the crown surface extends from or closely adjacent the threaded bore at one end of the nut body and tapers downwardly to the outer corners 15 of the nut body, the indentations 24 being disposed in the crown 16 to provide distorted thread portions 18 intermediate undistorted thread portions 20, the distorted thread portions resulting from indenting the crown metal at 24 radially inwardly and slightly axially.

The crown lock nut 10 or 10a is preferably made of steel, including low carbon steel grades C–1108 to 1110. The surface of the crown extension 16 embodies a taper ranging from about 45° to about 20° to the vertical, i.e. from about 90° to about 40° included angle.

Figure 2:
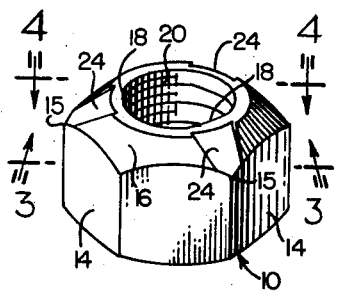
FIG. 2 is a perspective view of a lock nut having indentations in the crown surface, according to the instant invention.
Figure 3:
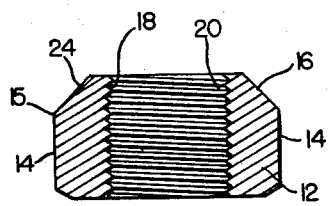
FIG. 3 is a vertical sectional view taken substantially on the line 3—3 of FIG. 2.
Figure 4:
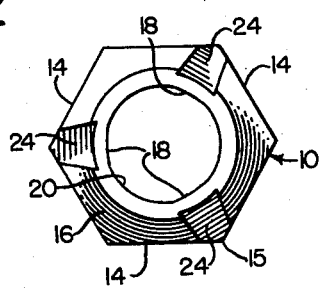
FIG. 4 is a top plan view of the lock nut shown in FIG. 2.

In the indented crown lock nut of FIGS. 2, 3 and 4, the indenting portion of the impacting tool provides a slightly deeper indentation at the top edge of the crown 16 than at or adjacent the corners 15. This configuration provides a slightly greater axial than radial movement of metal.

In operation, the lock nut 10 or 10a is produced from a cut section of round bar stock, cold-headed into the nut body and crown configuration here disclosed, threaded in its bore, and impacted in projection areas or indented as disclosed above. The lock nuts will be free spinning on studs until the stud threads reach the distorted thread portions 18, thereafter the nuts must be threaded onto the studs by wrenches or other mechanical devices.

It will of course be understood that lock nuts embodying the inventive concept may be made with four side walls as a square nut, as a six-sided hex nut, with twelve points, or round as a weld nut. The crown extension in each instance tapers downwardly from the top edge of the extension to the outer edge or side walls of the nut body, without an undercut or indented portion. The number of indentations 24 that are applied to the lock nuts of this invention is variable. It is recommended that at least two such indentations be used in order to provide a balance nut, however the number that can be employed may go to six or more, depending upon the size of the lock nut and the locking torque values desired or required.

It was found in forming lock nuts with indentations 24 on the crown 16 that locating the indentations at mid-points of the side walls 14, instead of at the corners 15, as shown in FIGS. 2, 3 and 4, resulted in a greater deformation of the crown without at the same time improving the locking torque of the nut. Upon shifting the indentations 24 to the corners of the nut, it was found that the indentations could be lengthened thus increasing the area of the indentations, the distortion of the crown was reduced, and the deformation of the threads in the path of the indentations could be more accurately controlled to produce the desired or required locking torque.

The lock nuts produced with indentations, as shown in FIGS. 2, 3 and 4 were provided with indentations in the crown 16 having an angle of approximately 53° to the vertical, thus creating a greater axial than radial movement, and resulting in a slightly greater distortion of the crown. The indentations 24 were blended into the corners 15 of the nut to provide a more evenly distributed impaction of the crown metal.

A crown 16 having a frusto-conical outer surface is shown in the several views of the drawing and is described above. Each filament of such surface extends from the sides or side walls of the nut body to the upper end of the crown in a substantially direct line therebetween. The crown is provided with indentations formed by impaction, the impacted areas being distributed about the periphery of the crown in a geometrical symmetric pattern. The resultant of such impaction in selected areas of the crown wall is a substantial balancing of the strains generated by the radially inwardly directed impacted portions about the axis of the nut, producing the desirable benefits and advantages above described. The outer surface of the crown extends from the sides of the nut body, be it hexagonal, round, square, twelve-point or other form in transverse cross-section, substantially directly to the end of the crown adjacent the threaded bore.

Low carbon steels of the grades above specified have been used to make lock nuts embodying the inventive concept. However, alloy steels of the 4037 Series and high carbon steels in the 1038 range may also be used. In addition, certain high tensile aluminum alloys should also be considered for the lock nuts of this invention, to meet the requirements of various applications where a lighter weight metal is desirable, as in aircraft service.

Having described the invention in its simplest terms, it is to be understood that the features of construction may be changed or varied in greater or lesser degree without departing from the essence of the invention defined in the appended claims.

I claim:

1. In a prevailing torque lock nut, a polygonal nut body having a threaded bore and a tapered frusto-conical crown at one end thereof, each filament of the entire circumferential outer surface of said crown extending from the sides of said nut body to the end of said crown adjacent said threaded bore in a substantially direct line therebetween, the wall of said crown being indented at selected areas and thereby having a plurality of substantially radially inwardly directed impacted portions forming areas of relatively greater density and resiliency, said impacted portions comprising at least two impacted areas distributed about the outer circumferential surface of said crown in a geometrical symmetric pattern whereby the strains generated by the radially inwardly directed impacted portions are substantially balanced about the axis of the nut, each of said impacted portions having a substantially continuous bottom surface lying inwardly of the outer surface of the crown, an upper edge terminating adjacent the upper end of said crown, and side and bottom edges terminating substantially flush with and adjacent the sides of said nut body, said impacted portions having a greater intrusion adjacent said crown upper end, each of said intrusions diminishing to a substantial coincidence with the plane of said crown wall surface adjacent the sides of said nut body, the width of said intrusions adjacent the upper end of said crown being greater than and tapering toward a somewhat narrower width at the lower end of said intrusions adjacent said sides, said crown wall having a taper angle of from approximately 20° to 45° to the vertical axis of the nut, the areas of lesser density intermediate said impacted portions providing an elastic resilient component therefor, the threaded portions adjacent to and in the radial and axial path of said inwardly impacted portions being displaced inwardly of said bore.

2. In a prevailing torque lock nut, a polygonal nut body having a threaded bore and a tapered frusto-conical crown at one end thereof, each filament of the entire circumferential outer surface of said crown extending from the sides of said nut body to the end of said crown adjacent said threaded bore in a substantially direct line therebetween, the wall of said crown being indented at selected areas and thereby having a plurality of substantially radially inwardly directed impacted portions forming areas of relatively greater density and resiliency, said impacted portions comprising at least two impacted areas distributed about the outer circumferential surface of said crown in a geometrical symmetric pattern whereby the strains generated by the radially inwardly directed impacted portions are substantially balanced about the axis of the nut, each of said impacted portions having a substantially continuous bottom surface lying inwardly of the outer surface of the crown, an upper edge terminating adjacent the upper end of said crown, and side and bottom edges terminating substantially flush with and adjacent the sides of said nut body, said impacted portions having a greater intrusion adjacent said crown upper end, each of said intrusions diminishing to a substantial coincidence with the plane of said crown wall surface adjacent the sides of said nut body, said crown wall having a taper angle of from approximately 20° to 45° to the vertical axis of the nut, the areas of lesser density intermediate said impacted portions providing an elastic resilient component therefor, the threaded portions adjacent to and in the radial and axial path of said inwardly impacted portions being displaced inwardly of said bore.

3. The structure defined in claim 2, and in which said impacted portions are spaced equally apart from each other about the periphery of said crown wall.

4. The structure defined in claim 2, and in which said impacted portion are disposed at selected corners of a nut body having flat side walls.

References Cited by the Examiner

UNITED STATES PATENTS

| | | |
|---|---|---|
| 890,339 | 6/08 | Cooper. |
| 1,303,784 | 5/19 | Emery _____ 151—19 |
| 1,522,565 | 1/25 | Whitman. |
| 1,945,216 | 1/34 | Dunham. |
| 2,054,393 | 9/36 | Sharp. |
| 2,163,677 | 6/39 | Goeller _____ 85—9 |
| 2,452,192 | 10/48 | Hosking. |
| 2,923,339 | 2/60 | Skidmore. |

FOREIGN PATENTS 1,228,099  3/60  France.

EDWARD C. ALLEN, *Primary Examiner.*

M. HENSON WOOD, JR., *Examiner.*